US007768546B1

(12) United States Patent
Boehringer, Jr.

(10) Patent No.: US 7,768,546 B1
(45) Date of Patent: Aug. 3, 2010

(54) INTEGRATED SECURITY SYSTEM AND METHOD

(75) Inventor: Roger A. Boehringer, Jr., Newport Beach, CA (US)

(73) Assignee: Axcess International, Inc., Addison, TX (US)

( * ) Notice: Subject to any disclaimer, the term of this patent is extended or adjusted under 35 U.S.C. 154(b) by 893 days.

(21) Appl. No.: 09/569,523

(22) Filed: May 12, 2000

(51) Int. Cl.
*H04N 7/18* (2006.01)
*G08B 21/00* (2006.01)

(52) U.S. Cl. .................. 348/143; 348/156; 340/540

(58) Field of Classification Search ......... 348/143–144, 348/151–156, 159, 161, 169, 715, 148, 196; 382/103; 340/541–540; 709/201; 386/107

See application file for complete search history.

(56) References Cited

U.S. PATENT DOCUMENTS

| | | | |
|---|---|---|---|
| 3,811,008 A | 5/1974 | Lee | 178/6.6 A |
| 3,868,640 A | 2/1975 | Binnie et al. | 340/151 |
| 4,281,354 A | 7/1981 | Conte | 360/5 |
| 4,303,910 A | 12/1981 | McCann | 340/572 |
| 4,449,189 A * | 5/1984 | Feix et al. | 704/272 |
| 4,458,266 A | 7/1984 | Mahoney | 358/105 |
| 4,471,345 A | 9/1984 | Barrett, Jr. | 340/572 |
| 4,528,663 A | 7/1985 | Citta | 370/94 |
| 4,598,275 A | 7/1986 | Ross et al. | 340/573 |
| 4,691,202 A | 9/1987 | Denne et al. | 340/825.54 |
| 4,774,570 A | 9/1988 | Araki | 358/108 |
| 4,777,526 A | 10/1988 | Saitoh et al. | 358/108 |
| 4,822,990 A | 4/1989 | Tamada et al. | 235/492 |
| 4,831,438 A * | 5/1989 | Bellman et al. | 348/148 |
| 4,862,160 A | 8/1989 | Ekchian et al. | 340/825.54 |
| 4,951,147 A | 8/1990 | Aknar et al. | 358/209 |
| 4,955,038 A | 9/1990 | Lee et al. | 375/35 |
| 5,086,480 A | 2/1992 | Sexton | 382/18 |
| 5,109,278 A | 4/1992 | Erickson et al. | 358/108 |
| 5,111,291 A | 5/1992 | Erickson et al. | 358/108 |
| 5,153,878 A | 10/1992 | Krebs | 370/95.1 |
| 5,175,729 A | 12/1992 | Borras et al. | 370/79 |
| 5,202,759 A * | 4/1993 | Laycock | 348/152 |
| 5,220,557 A | 6/1993 | Kelley | 370/50 |

(Continued)

FOREIGN PATENT DOCUMENTS

EP 0 161 779 A1 11/1985

(Continued)

OTHER PUBLICATIONS

Notification of Transmittal of International Search Report and International Search Report dated Sep. 13, 2001 corresponding to International Appln. No. PCT/US 01/14467 filed May 3, 2001.

(Continued)

*Primary Examiner*—Gims S Philippe
(74) *Attorney, Agent, or Firm*—Fay Kaplun & Marcin, LLP

(57) ABSTRACT

An integrated security system includes a video camera operable to collect real-time video information and an identification reader operable to collect real-time character-based information corresponding to the video information. The character-based information is received from an identifier unit proximate to the identification reader. The system also includes an integrator operable to integrate the video information and the character-based information.

67 Claims, 3 Drawing Sheets

U.S. PATENT DOCUMENTS

| | | | |
|---|---|---|---|
| 5,227,803 A | 7/1993 | O'Connor et al. | 342/442 |
| 5,229,850 A | 7/1993 | Toyoshima | 358/108 |
| 5,237,408 A | 8/1993 | Blum et al. | 358/108 |
| 5,266,925 A | 11/1993 | Vercellotti et al. | 340/572 |
| 5,272,476 A | 12/1993 | McArthur et al. | 340/870.13 |
| 5,305,008 A | 4/1994 | Turner et al. | 342/44 |
| 5,351,052 A | 9/1994 | D'Hont et al. | 342/42 |
| 5,408,330 A * | 4/1995 | Squicciarini et al. | 386/107 |
| 5,425,032 A | 6/1995 | Shloss et al. | 370/95.2 |
| 5,448,242 A | 9/1995 | Sharpe et al. | 342/42 |
| 5,450,087 A | 9/1995 | Hurta et al. | 342/42 |
| 5,453,747 A | 9/1995 | D'Hont et al. | 342/42 |
| 5,471,212 A | 11/1995 | Sharpe et al. | 342/42 |
| 5,488,376 A | 1/1996 | Hurta et al. | 342/42 |
| 5,525,992 A | 6/1996 | Froschermeier | 342/42 |
| 5,525,994 A | 6/1996 | Hurta et al. | 342/51 |
| 5,526,133 A | 6/1996 | Paff | 358/335 |
| 5,539,394 A | 7/1996 | Cato et al. | 340/825.54 |
| 5,589,873 A | 12/1996 | Natori et al. | 348/15 |
| 5,621,412 A | 4/1997 | Sharpe et al. | 342/42 |
| 5,640,151 A | 6/1997 | Reis et al. | 340/825.54 |
| 5,668,803 A | 9/1997 | Tymes et al. | 370/312 |
| 5,686,902 A | 11/1997 | Reis et al. | 340/825.54 |
| 5,721,733 A | 2/1998 | Wang et al. | 370/332 |
| 5,737,330 A | 4/1998 | Fulthorp et al. | 370/346 |
| 5,745,037 A | 4/1998 | Guthrie et al. | 340/573 |
| 5,837,982 A | 11/1998 | Fujioka | 235/382 |
| 5,892,454 A | 4/1999 | Schipper et al. | 340/825.37 |
| 5,903,321 A * | 5/1999 | Tung et al. | 348/715 |
| 6,271,752 B1 * | 8/2001 | Vaios | 340/541 |
| 6,433,683 B1 * | 8/2002 | Robinson | 340/540 |
| 6,460,069 B1 * | 10/2002 | Berlin et al. | 709/201 |
| 6,570,498 B1 * | 5/2003 | Frost et al. | 340/540 |

FOREIGN PATENT DOCUMENTS

| | | |
|---|---|---|
| EP | 0 221 631 A2 | 8/1986 |
| EP | 0 245 555 A1 | 11/1987 |
| EP | 0 467 036 A2 | 1/1992 |
| EP | 0 565 046 A2 | 10/1993 |
| EP | 0 781 049 A2 | 6/1997 |
| GB | 2187317 A | 9/1987 |
| GB | 2 250 156 A | 5/1992 |
| GB | 2 295 065 A | 5/1996 |
| WO | WO 88/04082 | 6/1988 |
| WO | WO 90/01838 | 2/1990 |
| WO | WO 91/17515 | 11/1991 |
| WO | WO 93/04537 | 3/1993 |
| WO | WO 9603839 A1 | 2/1996 |
| WO | WO 96/27864 | 9/1996 |

OTHER PUBLICATIONS

U.S. Appl. No. 09/148,413, entitled "Event Monitoring," filed Sep. 4, 1998, 31 pages, Sep. 4, 1998.

U.S. Appl. No. 09/298,982, "Distributed Tag Reader System and Method," filed by Wayne E. Steeves, Apr. 22, 1999.

U.S. Appl. No. 08/789,148, "Radio Tag System and Method with Improved Tag Interference Avoidance," filed by Wayne E. Steeves, Jan. 24, 1997.

"Radio Frequency Identification (RFID)—Standards, Common Applications, A Look Ahead, and Recommended Reading," http://www.aimglobal.org/techinfo/rfid/rfidintro.html, 4 pgs, Printed Jun. 7, 1999.

AIM International, Inc., "Radio Frequency Identification RFID—A Glossary: AIM International WP-98/001R," http://www.aimglobal.org/techinfo/rfid/aimrfidglossary.html, Printed Jun. 7, 1999.

AIM International, Inc., "Radio Frequency Identification RFID—A Basic Primer: AIM International WP-98/002R," http://www.aimglobal.org/techinfo/rfid/aimrfidbasics.html, Printed Jun. 7, 1999.

* cited by examiner

INTEGRATED SECURITY SYSTEM AND METHOD

TECHNICAL FIELD OF THE INVENTION

This invention relates generally to security systems, and more particularly to an integrated security system and method.

BACKGROUND OF THE INVENTION

Video cameras have been used for many years to monitor areas and provide security. The video cameras provide video information that may be stored and played back at a later time. Radio receivers and transmitters have also been used for many years to identify personnel and objects in a particular area. For example, many systems are known for attaching radio tags to items such as company assets. When assets equipped with radio tags enter a certain area, the assets are automatically identified, helping to provide security. Innumerable other applications for such radio tag systems have also been identified. The radio tags generally transmit one or more forms of character-based information such as, for example, ASCII character data.

Typical systems that process video and character-based information usually record all video and character-based information detected in a particular area for a given time period. The video information and the character-based information are also often stored separately.

A problem with this approach is that it generates a large amount of data that must be stored. Each video image requires storage space in a storage device, and a large number of images may be collected in a short period of time. When multiple video cameras are used in a system, the amount of storage space needed for the images grows even more. Another problem with this approach is that the system often does not integrate the video and character-based information. The video and character-based information are usually stored separately and remain separate.

SUMMARY OF THE INVENTION

The present invention recognizes a need for an improved integrated security system and method that reduce or eliminate shortcomings of prior systems and methods. In particular, video information may be integrated with character-based information to provide an integrated security system.

In accordance with one aspect of the present invention, a method for providing integrated security at a control point includes receiving real-time video information from a video camera, and receiving real-time character-based information corresponding to the video information. The character-based information is received from an identifier unit proximate to an identification reader. The method also includes integrating the video information and the character-based information.

More specifically, in a particular embodiment of the present invention, the character-based information and the video information are integrated by generating one or more data messages containing the character-based information, the video information, and a header identifying characteristics of the video and character-based information. In another particular embodiment, the video camera is activated after the character-based information is received.

In accordance with another aspect of the present invention, a security signal for an integrated security system includes a transmission medium and a message carried on the transmission medium. The message includes real-time video information collected by a video camera, real-time character-based information corresponding to the real-time video information, and a header identifying characteristics of the video and character-based information. The character-based information is received from an identifier unit proximate to an identification reader.

Technical advantages of the present invention include providing an integrated security system. In particular, integrating real-time video information and real-time character-based information allows convenient monitoring of certain areas. A user may monitor both the video information and the character-based information that corresponds to that video information.

Another advantage of the present invention is that the integrated video and character-based information may be stored together. When the stored information is recalled, both the video and the corresponding character-based information may be retrieved. The system does not need to search through all of the stored information to locate corresponding video and character-based information.

A further advantage is the decreased amount of data that must be stored and processed by the system. By activating the video camera after receiving the character-based information, the video camera requires less storage space because the video camera produces fewer images. The video camera remains inactive until triggered by the system, so smaller amounts of video information are generated and stored in the system.

Other technical advantages are readily apparent to one of skill in the art from the attached Figures, description, and claims.

BRIEF DESCRIPTION OF THE DRAWINGS

For a more complete understanding of the present invention and the advantages thereof, reference is now made to the following descriptions taken in connection with the accompanying drawings, in which.

DETAILED DESCRIPTION OF THE INVENTION

Figure 1:
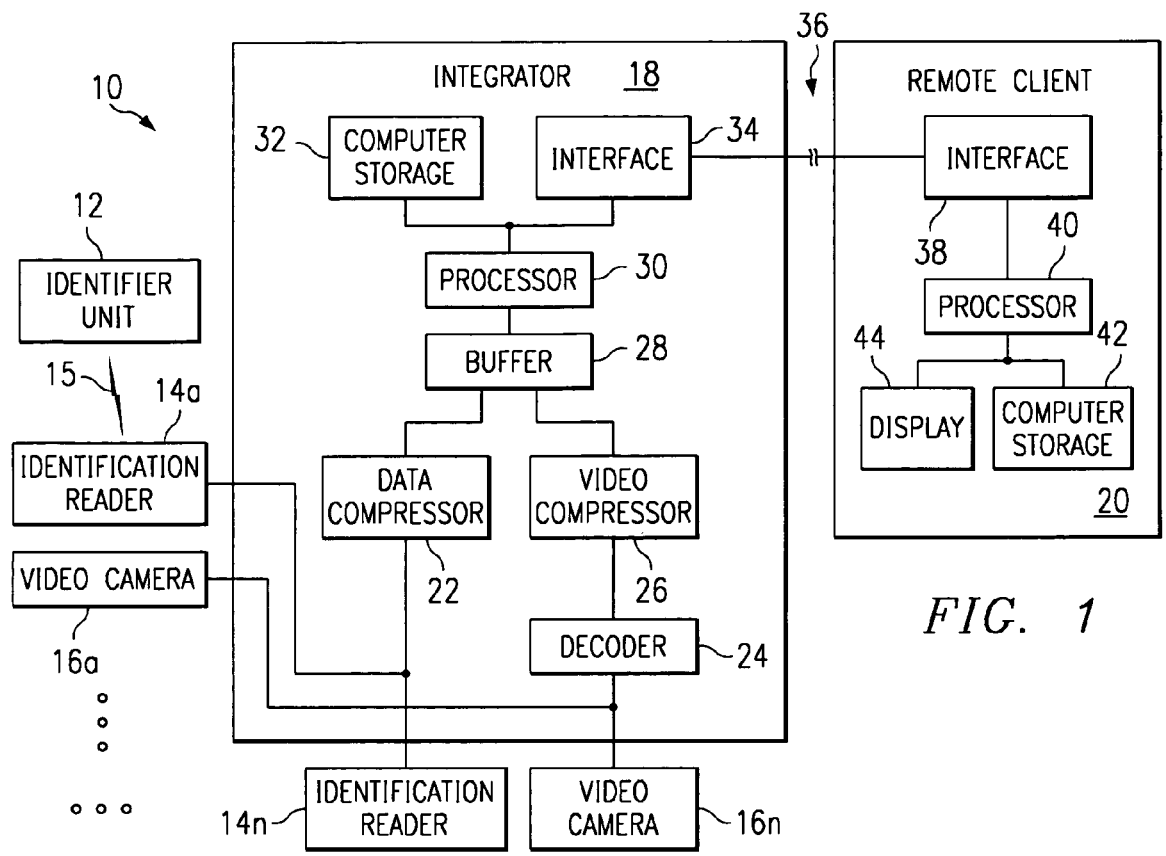
FIG. 1 is a block diagram illustrating an exemplary integrated security system constructed in accordance with one embodiment of the present invention.

FIG. 1 is a block diagram illustrating an exemplary integrated security system 10 constructed in accordance with one embodiment of the present invention. In the illustrated embodiment, system 10 comprises an identifier unit 12, a plurality of identification readers 14a-14n, a plurality of video cameras 16a-16n, an integrator 18, and a remote client 20.

Identifier unit 12 is operable to provide character-based information to identification reader 14. The character-based information could, for example, comprise ASCII character data. Identifier unit 12 may comprise any suitable structure or device operable to provide character-based information to identification reader 14. In one embodiment, identifier unit 12 comprised a radio frequency identification (RFID) tag operable to communicate information on a radio frequency. An exemplary RFID tag may be found in U.S. Pat. No. 6,034,603, entitled "Radio Tag System and Method with Improved Tag Interference Avoidance." In another embodiment, identifier unit 12 comprises a card with a magnetic strip encoded with character-based information such as, for example, an ATM card. Other embodiments of identifier unit 12 may be used without departing from the scope of the present invention.

Each identification reader 14 is operable to communicate with integrator 18. Identification reader 14 is also operable to retrieve character-based information from identifier unit 12 and to transmit character-based information to integrator 18. An identification reader 14 may collect character-based information from identifier unit 12 when identifier unit 12 is proximate to, or in range of, identification reader 14. Identification reader may comprise any hardware, software, firmware, or combination thereof operable to retrieve character-based information from identifier unit 12. Identification reader 14 may, for example, comprise a RFID reader or a magnetic strip reader such as an ATM machine. Different types of identification readers 14a-14n may be used in system 10, and any number of identification readers 14a-14n may be coupled to integrator 18.

In one embodiment, identifier unit 12 and identification reader 14 may communicate over a communication link 15. Communication link 15 may comprise any suitable wireless or wireline, link operable to facilitate communication of character-based information from identifier unit 12 to identification reader 14. Communication link 15 may, for example, comprise a radio frequency communication link.

Each video camera 16 is operable to communicate with integrator 18. Video camera 16 is also operable to collect video information and to transmit video information to integrator 18. The video information may comprise a single frame or a series of frames, each frame corresponding to a video image. Each video camera 16 may comprise any suitable camera such as, for example, a digital, analog, or infrared camera. In a particular embodiment, video camera 16 may comprise a National Television Standards Committee (NTSC) or Phase Alternate Line (PAL) camera. In another particular embodiment, video camera 16 may comprise a Pan-Tilt-Zoom camera operable to pan, tilt, and/or zoom to alter the field of view of video camera 16. Different types of video cameras 16a-16n may be used in system 10, and any number of video cameras 16a-16n may be coupled to integrator 18.

Integrator 18 is operable to communicate with identification readers 14a-14n and video cameras 16a-16n and to receive character-based information from identification readers 14a-14n and video information from video cameras 16a-16n. Integrator 18 is also operable to integrate the character-based information and the video information. Integrator 18 is further operable to communicate the character-based information and the video information to remote client 20. In addition, integrator 18 may be operable to activate identification readers 14a-14n and/or video cameras 16a-16n in order to retrieve video and/or character-based information. If a video camera 16 comprises a Pan-Tilt-Zoom camera, integrator 18 may also be operable to control video camera 16 and instruct video camera 16 to pan, tilt, or zoom. Integrator 18 may comprise any hardware, software, firmware, or combination thereof operable to receive and integrate video and character-based information. Integrator 18, for example, comprise logic stored in a computer processable medium. The logic may be encoded in hardware, software instructions, and/or firmware instructions stored in any suitable device such as, for example, a random access memory (RAM), a read-only memory (ROM), an application-specific integrated circuit (ASIC), or a field programmable gate array (FPGA).

In the illustrated embodiment, integrator 18 comprises a data compressor 22, a decoder 24, a video compressor 26, a buffer 28, a processor 30, a computer storage 32, and an interface 34. Data compressor 22 is coupled to identification readers 14 and buffer 28. Data compressor 22 is operable to compress the character-based information received from identification readers 14 and to communicate the compressed character-based information to buffer 28. Data compressor 22 may comprise any hardware, software, firmware, or combination thereof operable to compress character-based information. In one embodiment, data compressor 22 receives ASCII data from identification readers 14, and data compressor 22 performs a bitwise compression on the ASCII data. In another embodiment, data compressor 22 compresses the character-based information using a Huffman compression algorithm.

Decoder 24 is coupled to video cameras 16 and video compressor 26. Decoder 24 is operable to receive analog video signals from video cameras 16. Decoder 24 is also operable to digitize the analog video signals and to communicate the digitized video information to video compressor 26. Decoder 24 may comprise any hardware, software, firmware, or combination thereof operable to digitize analog video information from video cameras 16.

Video compressor 26 is coupled to decoder 24 and buffer 28. Video compressor 26 is operable to receive video information from decoder 24. Video compressor 26 is also operable to compress the video information received from decoder 24 and to communicate the compressed video information to buffer 28. Video compressor 26 may comprise any hardware, software, firmware, or combination thereof operable to perform any suitable video compression. Video compressor 26 may, for example, perform Motion Pictures Experts Group (MPEG) or motion Joint Photographic Experts Group (JPEG) compression. Other exemplary video compression schemes are described in U.S. Pat. No. 4,843,466, entitled "Method and System for Decompressing Color Video Slope Encoded Data," and U.S. Pat. No. 4,847,677, entitled "Video Telecommunication System and Method for Compressing and Decompressing Digital Color Video Data."

Buffer 28 is coupled to data compressor 22, video compressor 26, and processor 30. Buffer 28 is operable to receive character-based information from data compressor 22 and video information from video compressor 26. Buffer 28 is also operable to store the character-based information and video information and to facilitate retrieval of the information by processor 30. Buffer 28 may comprise any hardware, software, firmware, or combination thereof operable to store and facilitate retrieval of character-based information and video information. Buffer 28 may, for example, comprise a first-in, first-out queue.

Processor 30 is coupled to buffer 28, computer storage 32, and interface 34. Processor 30 is operable to retrieve video and character-based information stored in buffer 28. Processor 30 is also operable to integrate the character-based and video information. In one embodiment, processor 30 integrates the video and character-based information by generating one or more messages containing the video information and corresponding character-based information. At least one of the messages also includes a header that provides control and other information about the video and character-based information in the message. The header is used by remote client 20 to process the data message. In a particular embodiment, processor 30 generates a single data message having one frame of video information and the corresponding character-based information. Processor 30 is further operable to communicate the messages to computer storage 32 for storage and to interface 34 for transmission to remote client 20.

Computer storage 32 is coupled to processor 30. Computer storage 32 may be operable to store one or more computer programs for execution on processor 30. Computer storage 32 is also operable to store and facilitate retrieval of data messages generated by processor 30 containing video and/or character-based information. Processor 30 may, for example, temporarily store the data messages when integrator 18 becomes unable to communicate with remote client 20. Computer storage 32 may comprise any hardware, software, firmware, or combination thereof operable to store and facilitate retrieval of information by processor 30. Although computer storage 32 is illustrated as being a component of integrator 18, computer storage 32 may be located in any position accessible by processor 30.

Interface 34 is coupled to processor 30. Interface 34 is operable to facilitate the transmission of data messages containing video and/or character-based information to remote client 20 over a transmission medium 36. Interface may comprise any hardware, software, firmware, or combination thereof operable to communicate data messages across transmission medium 36. Interface 34 may, for example, comprise an asynchronous communication driver (ACD) or a Transfer Communication Protocol/Internet Protocol (TCP/IP) interface.

Transmission medium 36 communicatively couples integrator 18 and remote client 20. Transmission medium 36 may comprise any suitable wireless or wireline connection operable to facilitate communication between integrator 18 and remote client 20. Transmission medium 36 may, for example, comprise a wireline TCP/IP connection or a radio frequency communication link.

Remote client 20 is communicatively coupled to integrator 18 through transmission medium 36. Remote client 20 is operable to receive data messages containing video and/or character-based information from integrator 18. Remote client 20 is also operable to store the messages and/or output the video and character-based information to a user of remote client 20. Remote client 20 may comprise any suitable computing device. Remote client 20 may, for example, comprise a personal computer running a Windows 95, Windows 98, or Windows NT operating system at a security control point. In the illustrated embodiment, remote client 20 comprises an interface 38, a processor 40, a computer storage 42, and a display 44. Other embodiments of remote client 20 may be used without departing from the scope of the present invention.

Interface 38 is coupled to processor 40. Interface 38 is operable to receive messages containing video and/or character-based information from integrator 18 over transmission medium 36. Interface 38 is also operable to communicate the messages to processor 40. Interface 38 may comprise any hardware, software, firmware, or combination thereof operable to communicate with integrator 18 over transmission medium 36. Interface 38 may, for example, comprise an ACD or a TCP/IP interface.

Processor 40 is coupled to interface 38, computer storage 42, and display 44. Processor 40 is operable to receive the data messages containing video and/or character-based information from interface 38 and to store the messages in computer storage 42. Processor 40 is also operable to process the messages received from integrator 18 by, for example, extracting and decompressing the video and character-based information contained in the messages. Processor 40 may be further operable to reassemble a series of data messages received from integrator 18 into a single video image or a series of images. In addition, processor 40 may be operable to output the video and character-based information to, for example, display 44.

Computer storage 42 is coupled to processor 40. Computer storage 42 is operable to store messages containing video and/or character-based information received from integrator 18. Computer storage 42 is also operable to facilitate retrieval of the messages by processor 40. Computer storage 42 may comprise any hardware, software, firmware, or combination thereof operable to store and facilitate retrieval of information by processor 40. Although computer storage 42 is illustrated in FIG. 1 as residing within remote client 20, computer storage 42 may be located in any position accessible by processor 40.

Display 44 is coupled to processor 40. Display 44 is operable to receive video and/or character-based information from processor 40 and to output the information to a user of remote client 20. Display 44 may comprise any suitable display device such as, for example, a computer monitor. The information may be displayed in any suitable manner such as, for example, in a single window, separate windows, side-by-side windows, and overlaid images.

In operation, identification readers 14a-14n collect character-based information from one or more identifier units 12, and video cameras 16a-16n collect video information. The character-based and video information are communicated to integrator 18, which may compress and store the information in buffer 28. Processor 30 retrieves the information from buffer 28 and integrates the video and character-based information. Processor 30 may, for example, packetize the video and character-based information into one or more data messages for transmission to remote client 20. Each data message may contain video information and character-based information corresponding to that video information. The character-based information may correspond to the video information in any number of ways. For example, the character-based information may be associated with an activity that occurs at least proximate to the field of view of video camera 16. An activity occurs at least proximate to the field of view of video camera 16 when the activity occurs in or near a location that video camera 16 is currently viewing or may view, for example, by panning, tilting, or zooming. The messages could also contain only video information if identification readers 14a-14n did not collect any character-based information, and only character-based information if no video information was collected by video cameras 16a-16n. Processor 30 stores the data messages in computer storage 32, and processor 30 communicates the data messages to interface 34 for transmission to remote client 20.

Remote client 20 receives the data messages from integrator 18 over transmission medium 36, and remote client 20 depacketizes the video and/or character-based information contained in the data messages. Remote client stores the data messages in computer storage 42, extracts the information in the data messages, and decompresses and displays the information to a user.

In another embodiment, video cameras 16a-16n collect video information after integrator 18 activates video cameras 16a-16n. Integrator 18 may receive character-based information from identification readers 14a-14n. In response to an activity associated with the character-based information, such as receiving the character-based information, processor 30 activates one or more video cameras 16a-16n. Integrator 30 may also instruct video camera 16 to pan, tilt, or zoom so that video camera 16 may collect video information from a different field of view. Processor 30 collects video information from video cameras 16a-16n and integrates the video information and the corresponding character-based information, such as the character-based information that triggered the activation of video cameras 16a-16n. Video cameras 16a-16n could also be triggered based on any other appropriate activity such as, for example, a timer or movement detected within the camera's field of view.

Similarly, identification readers 14a-14n may collect character-based information after integrator 18 activates identification readers 14a-14n. In this embodiment, integrator 18 may receive video information from video cameras 16a-16n. In response to an activity associated with the video information, such as receiving the video information, processor 30 activates one or more identification readers 14a-14n.

Although FIG. 1 illustrates one embodiment of system 10, those skilled in the art will recognize that numerous changes may be made to system 10 without departing from the scope of the present invention. For example, in the illustrated embodiment, integrator 18 comprises data compressor 22 and video compressor 26. In another embodiment, integrator 18 may compress only character-based information received from identification readers 14a-14n or only video information received from video cameras 16a-16n. Integrator 18 could also process uncompressed video and character-based information. Also, integrator 18 as illustrated in FIG. 1 uses a processor 30 to execute one or more software programs. As described earlier, integrator 18 may comprise any logic encoded in hardware, software instructions, and/or firmware instructions stored in any suitable device. In addition, although integrator 18 is illustrated in FIG. 1 as comprising decoder 24, decoder 24 may be unnecessary if integrator 18 is coupled to digital video cameras 16a-16n. Other changes may be made to integrator 18 without departing from the scope of the present invention.

Figure 2:
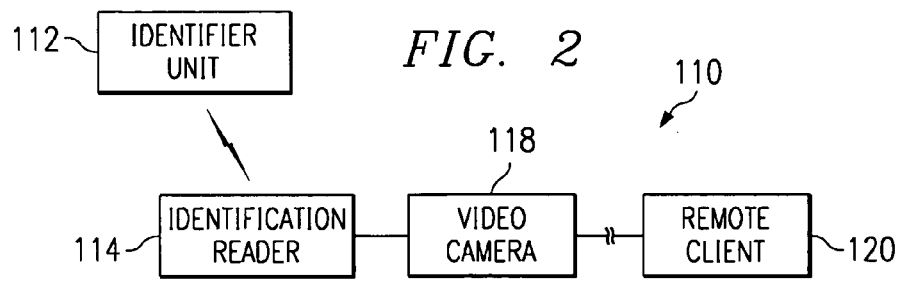
FIG. 2 is a block diagram illustrating another exemplary integrated security system constructed in accordance with one embodiment of the present invention.

FIG. 2 is a block diagram illustrating another exemplary integrated security system 110 constructed in accordance with one embodiment of the present invention. In the illustrated embodiment, system 110 comprises an identifier unit 112, an identification reader 114, a video camera 118, and a remote client 120. Identifier unit 112, identification reader 114, and remote client 120 may be the same or similar to identifier unit 12, identification reader 14, and remote client 20, respectively, from FIG. 1.

In the illustrated embodiment, video camera 118 comprises a digital video camera operable to collect digitized video information. Video camera 118 also includes one or more compressors operable to compress the character-based information received from identification reader 114 and/or the video information collected by video camera 118. Video camera 118 further includes logic encoded in hardware, software instructions, and/or firmware instructions that are operable to generate one or more data messages. The data messages contain the video information and the character-based information. At least one of the messages also includes a header identifying characteristics of the video and character-based information. In addition, video camera 118 includes a buffer, a computer storage, and an interface similar to integrator 18 from FIG. 1.

Although FIG. 2 illustrates one identification reader 114 and one video camera 118, any number of identification readers 114 and/or video cameras 118 may be used in system 110 without departing from the scope of the present invention.

Figure 3:
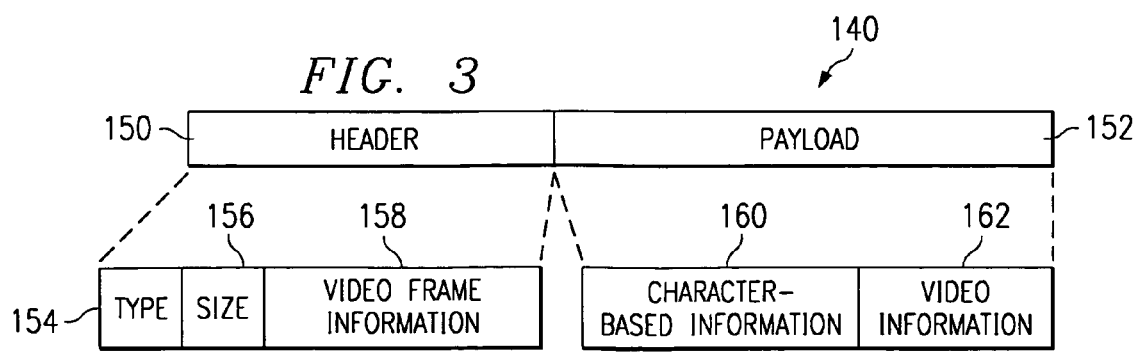
FIG. 3 is a diagram illustrating an exemplary data message used in the integrated security systems of FIGS. 1 and/or 2.

FIG. 3 is a diagram illustrating an exemplary data message 140 used in integrated security systems 10, 110 of FIGS. 1 and/or 2. In the illustrated embodiment, message 140 comprises a header 150 and a payload 152. Header 150 contains control information and other data used by remote client 20, 120 to process data message 140. Payload 152 contains video information collected by video cameras 16a-16n, 118 and/or character-based information collected by identification readers 14a-14n, 114. Other embodiments of message 140 may be used without departing from the scope of the present invention.

In the illustrated embodiment, header 150 comprises a type field 154, one or more size fields 156, and one or more video frame information fields 158. Type field 154 is operable to define the format for the remainder of header 150. In one embodiment of system 10, 110, message 140 may have one of a plurality of message formats, each message format having a corresponding format for header 150. The format of header 150 may vary depending on a wide variety of factors such as, for example, the amount of character-based information contained in message 140, the format of the video information contained in message 140, and the compression algorithm used to compress the video and/or character-based information. Remote client 20, 120 may use the information in type field 154, for example, to properly extract and decompress the video and character-based information in message 140.

Size field 156 is operable to identify the amount of data contained in at least a portion of message 140. In one embodiment, size field 156 identifies the amount of data contained in all fields of message 140. In another embodiment, size field 156 identifies the amount of data contained in all fields of message 140 except type field 154. In addition, size field 156 may identify the amount of data in individual fields of message 140. Size field 156 may, for example, identify the amount of video and/or character-based information contained in message 140.

Video frame information field 158 is operable to identify one or more characteristics of the video information contained in message 140. Video frame information field 158 may, for example, include information defining the height and width of a video image contained in message 140. Other characteristics include whether the video information is monochrome, whether the video information is key-frame or difference-frame, whether the video information comprises a single frame or a series of frames, and the compression algorithm used to compress the video information. Video frame information field 158 may include other characteristics of the video information without departing from the scope of the present invention.

Payload 152 comprises a character-based information field 160 and a video information field 162. Character-based information field 160 may contain character-based information collected by integrator 18 from identification readers 14a-14n. Video information field 162 may contain video information collected by integrator 18 from video cameras 16a-16n. In one embodiment, the video information contained in video information field 162 corresponds to the character-based information contained in character-based information field 160. The video information may correspond to the character-based information in any number of ways. For example, the character-based information could be the information that triggered the activation of video camera 16 or any activity that is proximate to identification reader 14 or video camera 16. In a particular embodiment, video information field 162 contains a single video image collected by video cameras 16a-16n. The character-based information and/or video information contained in message 140 may or may not be compressed.

Although FIG. 3 illustrates one embodiment of message 140, numerous changes may be made to message 140 without departing from the scope of the present invention. For example, in one embodiment all messages 140 include header 150. In another embodiment, some messages 140 may not include header 150. In a particular embodiment, the first message 140 in a series of messages 140 includes a header, and the remaining messages 140 do not. This allows more space in remaining messages 140 to be used to store video and/or character-based information.

Message 140 may also contain only video information or only character-based information. If integrator 18 collects video information from video cameras 16a-16n without collecting any corresponding character-based information from identification readers 14a-14n, payload 152 of message 140 may contain only video information field 162. Size field 156 may be operable to indicate that no character-based information is contained in message 140. Likewise, if integrator 18 collects character-based information from identification readers 14a-14n without collecting any corresponding video information from video cameras 16a-16n, payload 152 of message 140 may comprise only character-based information field 160. In these messages 140, video frame information field 158 may be omitted from header 150. Other changes may be made to message 140 without departing from the scope of the present invention.

Figure 4:
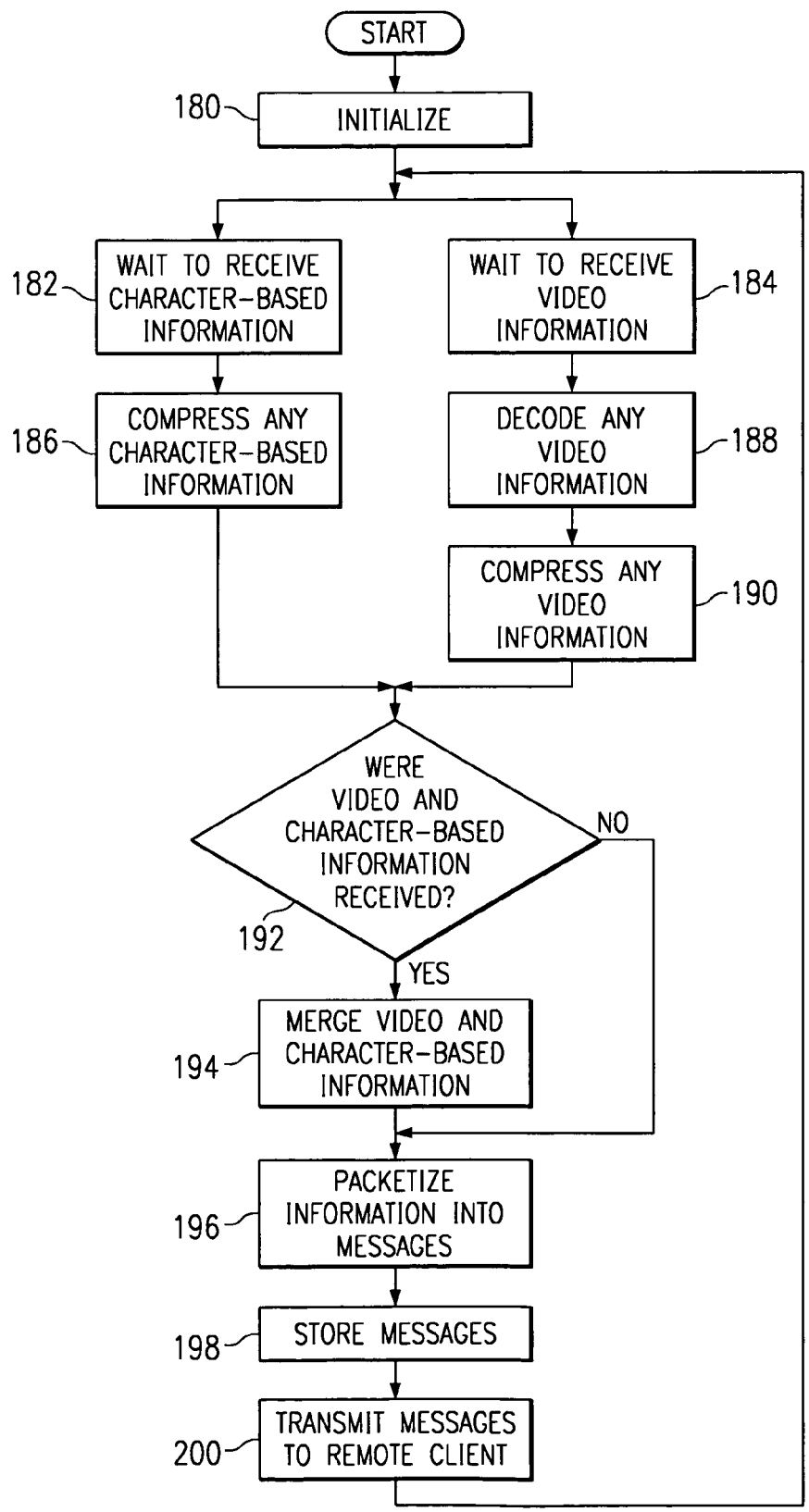
FIG. 4 is a flowchart illustrating an exemplary method for integrating video and character-based information.

FIG. 4 is a flowchart illustrating an exemplary method for integrating video and character-based information. At a step 180, system 10 is initialized. This may include, for example, clearing buffer 28. Integrator 18 waits to receive character-based information from one or more identification readers 14a-14n at a step 182. At the same time, integrator 18 may also wait to receive video information from one or more video cameras 16a-16n at a step 184. When integrator 18 receives character-based information from identification reader 14, integrator 18 may compress the character-based information at a step 186. When integrator 18 receives video information from video camera 16, integrator 18 may decode the video information at a step 188. Integrator 18 may also compress the video information at a step 190.

Integrator 18 determines whether both video and character-based information were received from video cameras 16a-16n and identification readers 14a-14n at a step 192. This may include, for example, processor 30 examining buffer 28 to determine if video and corresponding character-based information are stored in buffer 28. Processor 30 may use any suitable method for locating corresponding video and character-based information, such as locating video and character-based information collected within a given time period or collected during selected clock cycles.

If integrator 18 determines that only video or only character-based information was received at step 192, integrator 18 packetizes the received information at a step 196. This may include, for example, processor 30 generating one or more messages 140 containing only character-based information field 160 or only video information field 162 in payload 152. The header 150 of messages 140 may be modified to reflect that only video or only character-based information is contained in messages 140.

When integrator 18 receives both video and character-based information, integrator 18 integrates the video and character-based information at a step 194. This may include, for example, processor 30 retrieving the video information from buffer 28 and the character-based information corresponding to that video information from buffer 28 using any suitable method. Integrator 18 packetizes the video and character-based information at step 196. This may include, for example, processor 30 constructing one or more messages 140 containing both character-based information field 160 and video information field 162 in payload 152.

After generating one or more messages 140 at step 196, integrator 18 may store the messages 140 at a step 198. This may include, for example, processor 30 communicating the messages 140 to computer storage 32. Integrator 18 communicates the messages 140 to remote client 20 at a step 200. This may include, for example, processor 30 communicating the messages 140 to interface 34 for transmission over transmission medium 36. Integrator 18 may communicate the messages 140 to remote client 20 in real time, in batch mode, upon request, or at any other appropriate time.

Although FIG. 4 illustrates one exemplary method of integrating video and character-based information, those skilled in the art will recognize that numerous changes may be made to the method without departing from the scope of the present invention. For example, if a digital video camera 118 is used to collect the video information, the video information may not need to be decoded at step 188. Also, system 10 may process uncompressed video and/or character-based information, eliminating the need to compress the information at steps 186 and/or 190.

Figure 5:
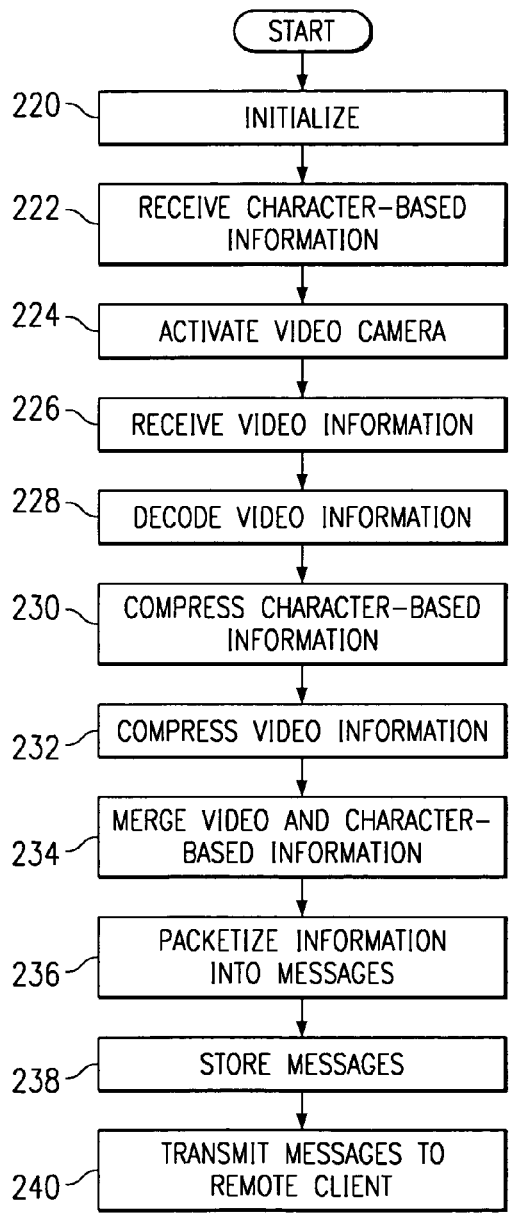
FIG. 5 is a flowchart illustrating another exemplary method for integrating video and character-based information.

FIG. 5 is a flowchart illustrating another exemplary method for integrating video and character-based information. System 10 is initialized at a step 220. This may include, for example, clearing all entries in buffer 28. Integrator 18 receives character-based information from identification readers 14a-14n at a step 222. In response to an activity associated with the character-based information, such as receiving the character-based information, integrator 18 activates one or more video cameras 16a-16n at a step 224. This may include, for example, processor 30 communicating an activation signal to video camera 16. After activating the video camera 16, integrator 18 receives video information from video camera at a step 226. Integrator 18 decodes the video information from video camera 16 at a step 228. Integrator 18 may compress the character-based information at a step 230, and integrator 18 may compress the video information at a step 232.

Integrator 18 integrates the video and character-based information at a step 234. This may include, for example, processor 30 retrieving the character-based information from buffer 28 and retrieving the video information corresponding to that character-based information from buffer 28. In one embodiment, the video information corresponds to the character-based information that triggered video cameras 16a-16n. Integrator 18 packetizes the video and character-based information at a step 236. This may include, for example, generating one or more messages 140 containing both character-based information field 160 and video information field 162 in payload 152. Integrator 18 may store the messages 140 at a step 238. This may include, for example, processor 30 communicating the messages 140 to computer storage 32. Integrator 18 communicates the messages 140 to remote client 20 at a step 240. This may include, for example, processor 30 communicating the messages 140 to interface 34, which communicates the messages over transmission medium 36.

Although FIG. 5 illustrates another exemplary method of integrating video and character-based information, those skilled in the art will recognize that numerous changes may be made to the method without departing from the scope of the present invention. For example, if a digital video camera 118 is used to collect the video information, the video information may not need to be decoded at step 228. Also, system 10 may process uncompressed video and/or character-based information, eliminating the need to compress the information at steps 230 and/or 232. Further, integrator 18 could receive video information first and then activate identification readers 14a-14n.

Figure 6:
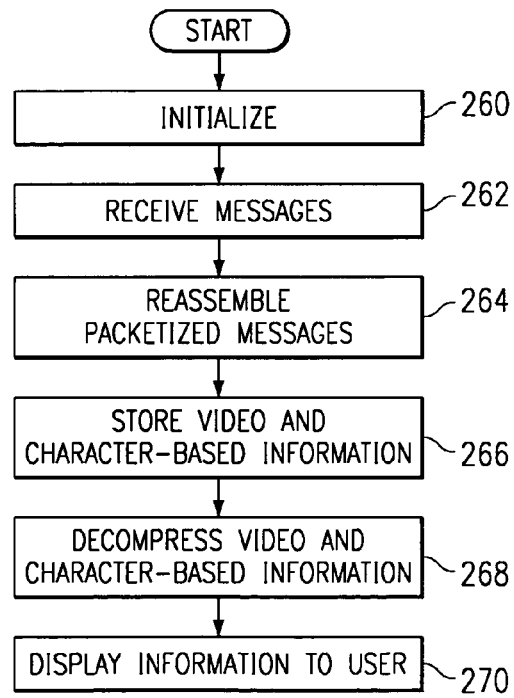
FIG. 6 is a flowchart illustrating an exemplary method for receiving and processing integrated video and character-based information.

FIG. 6 is a flowchart illustrating an exemplary method for receiving and processing integrating video and character-based information. System 10 is initialized at a step 260. This may include, for example, initializing interface 38 to receive messages 140 over transmission medium 36. Remote client 20 receives one or more data messages 140 over transmission medium 36 at a step 262. Remote client 20 reassembles the packetized messages at a step 264. This may include, for example, receiving one or more messages 140 from interface 38, extracting the character-based information and video information from each message 140, and reassembling the video and character-based information. After reassembling the character-based and video information, remote client 20 may store the video and character-based information at a step 266. This may include, for example, processor 40 communicating the video and character-based information to computer storage 42. Remote client 20 may decompress the video and/or character-based information at a step 268. This may include, for example, processor 40 retrieving information concerning the method of compression from header 150 of message 140. Remote client 20 may display the video and character-based information to a user at a step 270. This may include, for example, processor 40 communicating the video and character-based information to display 44.

Although FIG. 6 illustrates one method of processing video and/or character-based information received from integrator 18, numerous changes can be made to the method without departing from the scope of the present invention. For example, remote client 20 may decompress the video and/or character-based information before storing the information in computer storage 42.

Although the present invention has been described in several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. A method for providing integrated security at a control point, comprising:
   receiving real-time video information from a video camera;
   receiving real-time character-based information from an identifier unit in a field of view of the video camera and proximate to an identification reader;
   integrating the video information and the character-based information; and
   activating the identification reader in response to an activity associated with the video information.

2. The method of claim 1, further comprising activating the video camera in response to an activity associated with the character-based information.

3. The method of claim 1, further comprising activating the video camera after receiving the character-based information.

4. The method of claim 1, further comprising instructing the video camera to alter its field of view.

5. The method of claim 1, further comprising compressing the video information.

6. The method of claim 1, wherein the character-based information comprises radio frequency identification information.

7. The method of claim 1, wherein:
   the identifier unit comprises a radio frequency identification tag; and
   the identification reader comprises a radio frequency identification reader operable to communicate with the radio frequency identification tag.

8. The method of claim 1, further comprising activating the identification reader after receiving the video information.

9. The method of claim 1, further comprising compressing the character-based information.

10. The method of claim 1, wherein the identifier unit is mobile.

11. The method of claim 1, wherein integrating the character-based information and the video information comprises generating one or more data messages containing the character-based information, the video information, and a header identifying characteristics of the video and character-based information.

12. The method of claim 11, wherein each data message is operable to contain one frame of video information and the character-based information corresponding to the frame of video information.

13. The method of claim 11, further comprising communicating the data message to a remote client.

14. The method of claim 11, further comprising storing the data message.

15. An integrated security system comprising:
   a video camera operable to collect real-time video information;
   an identification reader operable to collect real-time character-based information corresponding to the video information from an identifier unit in a field of view of the video camera and proximate the identification reader, wherein the identification reader is activated in response to an activity associated with the video information; and
   an integrator operable to integrate the video information and the character-based information.

16. The system of claim 15, wherein the video camera comprises a digit video camera.

17. The system of claim 15, wherein the video camera is activated after the character-based information is collected by the identification reader.

18. The system of claim 15, wherein the video camera is operable to alter its field of view.

19. The system of claim 15, wherein:
   the identifier unit comprises a radio frequency identification tag; and
   the identification reader comprises a radio frequency identification reader operable to communicate with the radio frequency identification tag.

20. The system of claim 15, wherein the identification reader is activated after the video information is collected by the video camera.

21. The system of claim 15, wherein the identifier unit is mobile.

22. The system of claim 15, wherein the integrator comprises a processor operable to generate one or more data messages containing the character-based information, the video information, and a header identifying characteristics of the video and character-based information.

23. The system of claim 22, wherein each data message is operable to contain one frame of video information and the character-based information corresponding to the frame of video information.

24. The system of claim 22, wherein the integrator further comprises:
   a data compressor coupling the identification reader and the processor, the data compressor operable to compress the character-based information collected by the identification reader; and
   a video compressor coupling the video camera and the processor, the video compressor operable to compress the video information collected by the video camera.

25. The system of claim 24, wherein the video camera comprises an analog video camera, and wherein the integrator further comprises a decoder coupling the video camera and the video compressor, the decoder operable to digitize analog signals from the video camera.

26. The system of claim 22, wherein the video camera further comprises a computer storage coupled to the processor and operable to store the data message.

27. The system of claim 15, further comprising a remote client operable to receive the video information and the character-based information from the integrator.

28. The system of claim 27, wherein the remote client comprises a processor operable to extract the video information and the character-based information from one or more data messages received from the integrator.

29. The system of claim 28, wherein the processor is further operable to decompress the video information and the character-based information.

30. An integrated security system comprising:
   a digital video camera operable to collect real-time video information;
   an identification reader operable to collect real-time character-based information corresponding to the video information from an identifier unit in a field of view of the video camera and proximate the identification reader, wherein the identification reader is activated in response to an activity associated with the video information; and
   wherein the digital video camera is further operable to integrate the real-time video information and the character-based information.

31. The system of claim 30, wherein:
   the identifier unit comprises a radio frequency identification tag; and
   the identification reader comprises a radio frequency identification reader operable to communicate with the radio frequency identification tag.

32. The system of claim 30, wherein the identification reader is activated after the video information is collected by the video camera.

33. The system of claim 30, wherein the video camera is activated after the character-based information by the identification reader.

34. The system of claim 30, wherein the video camera is operable to alter its field of view.

35. The system of claim 30, wherein the identifier unit is mobile.

36. The system of claim 30, wherein the video camera comprises a processor operable to generate one or more data messages containing the character-based information, the video information, and a header identifying characteristics of the video and character-based information.

37. The system of claim 36, wherein each data message is operable to contain one frame of video information and the character-based information corresponding to the frame of video information.

38. The system of claim 36, wherein the video camera further comprises:
   a data compressor coupling the identification reader and the processor, the data compressor operable to compress the character-based information collected by the identification reader; and
   a video compressor coupled to the processor and operable to compress the video information collected by the video camera.

39. The system of claim 36, wherein the video camera further comprises a computer storage coupled to the processor and operable to store the data message.

40. The system of claim 30, further comprising a remote client operable to receive the video information and the character-based information from the video camera.

41. The system of claim 40, wherein the remote client comprises a processor operable to extract the video information and the character-based information from one or more data messages received from the video camera.

42. The system of claim 41, wherein the processor is further operable to decompress the video information and the character-based information.

43. A system for providing integrated security at a control point, comprising:
   logic stored on at east one computer processable medium; and
   the logic operable to:
      receive real-time video information from a video camera;
      receive real-time character-based information corresponding to the video information from an identifier unit in a field of view of the video of the video camera and proximate to an identification reader;
      integrate the video information and the character-based information; and
      activate the identification reader in response to an activity associated with the video information.

44. The system of claim 43, wherein the logic is further operable to activate the video camera in response to an activity associated with the character-based information.

45. The system of claim 43, wherein the logic is further operable to activate the video camera after receiving the character-based information.

46. The system of claim 43, wherein the logic is further operable to instruct the video camera to alter its field of view.

47. The system of claim 43, wherein the logic is further operable to receive compressed video information.

48. The system of claim 43, wherein the character-based information comprises radio frequency identification information.

49. The system of claim 43, wherein:
   the identifier unit comprises a radio frequency identification tag; and
   the identification reader comprises a radio frequency identification reader operable to communicate with the radio frequency identification tag.

50. The system of claim 43, wherein the logic is further operable to activate the identification reader after receiving the video information.

51. The system of claim 43, wherein the logic is operable to receive compressed character-based information.

52. The system of claim 43, wherein the identifier unit is mobile.

53. The system of claim 43, wherein integrating the character-based information and the video information comprises generating one or more data messages containing the character-based information, the video information, and a header identifying characteristics of the video and character-based information.

54. The system of claim 53, wherein each data message is operable to contain one frame of video information and the character-based information corresponding to the frame of video information.

55. The system of claim 53, wherein the logic is further operable to communicate the data message to a remote client.

56. A security signal for an integrated security system comprising:
    a transmission medium; and
    a message carried on the transmission medium, the message comprising:
        real-time video information collected by a video camera;
        real-time character-based information corresponding to the video information from an identifier unit in a field of view of the video camera and proximate to an identification reader, wherein the identification reader is activated in response to an activity associated with the video information; and
        a header identifying characteristics of the video and character-based information.

57. The system of claim 56, wherein the transmission medium comprises a wireless medium.

58. The system of claim 56, wherein the transmission medium comprises a wireline medium.

59. The system of claim 56, wherein the video information is compressed.

60. The system of claim 56, wherein the character-based information comprises radio frequency identification information.

61. The system of claim 56, wherein the character-based information is compressed.

62. The system of claim 56, wherein the identifier unit is mobile.

63. The system of claim 56, wherein:
    the identifier unit comprises a radio frequency identification tag; and
    the identification reader comprises a radio frequency identification reader operable to communicate with the radio frequency identification tag.

64. The system of claim 56, wherein the header comprises:
    a type field operable to identify a message type; and
    a size field operable to identify a size of at least a portion of the message.

65. The system of claim 64, wherein the size field is operable to identify an amount of character-based information in the message.

66. The system of claim 64, wherein the header further comprises one or more additional fields defined by the type field.

67. The system of claim 66, wherein the additional fields comprise a video frame identification filed operable to identify a characteristic of the video information.

* * * * *

UNITED STATES PATENT AND TRADEMARK OFFICE
CERTIFICATE OF CORRECTION

PATENT NO. : 7,768,546 B1 Page 1 of 1
APPLICATION NO. : 09/569523
DATED : August 3, 2010
INVENTOR(S) : Boehringer, Jr.

It is certified that error appears in the above-identified patent and that said Letters Patent is hereby corrected as shown below:

Claim 43, Column 14, Line 25:
"east" should be "least"

Claim 43, Column 14, Line 32:
"of the video of the video" should be "of the video"

Claim 67, Column 16, Line 27:
"filed" should be "field"

Signed and Sealed this

Sixteenth Day of November, 2010

David J. Kappos
*Director of the United States Patent and Trademark Office*